United States Patent [19]

Pliml, Jr.

[11] Patent Number: 4,752,171
[45] Date of Patent: Jun. 21, 1988

[54] FRICTIONALLY WELDED FASTENING ANCHOR

[75] Inventor: Frank V. Pliml, Jr., Arlington Heights, Ill.

[73] Assignee: Illinois Tool Works, Inc., Chicago, Ill.

[21] Appl. No.: 38,894

[22] Filed: Apr. 16, 1987

[51] Int. Cl.$^4$ ............................................. F16B 37/06
[52] U.S. Cl. ..................................... 411/171; 411/181;
411/82; 411/908; 411/3; 411/427; 52/787;
312/214; 156/294
[58] Field of Search ............... 411/171, 177, 181, 182,
411/908, 82, 2, 3, 512; 52/787; 174/138 D;
312/214; 156/294

[56] References Cited

U.S. PATENT DOCUMENTS

| | | | |
|---|---|---|---|
| 3,179,143 | 4/1965 | Schultz et al. | 411/82 |
| 3,316,861 | 5/1967 | Dailey | 411/908 X |
| 3,368,443 | 2/1968 | Faul | 411/427 |
| 3,460,428 | 8/1969 | Charles | 411/2 |
| 3,510,916 | 5/1970 | Phelan | 52/787 X |
| 3,771,272 | 11/1973 | Mihaly et al. | 52/787 |
| 4,018,257 | 4/1977 | Jack | 411/181 |
| 4,551,189 | 11/1985 | Peterson | 411/82 X |
| 4,636,124 | 1/1987 | Gugle et al. | 411/82 |
| 4,676,707 | 6/1987 | Cearlock et al. | 411/82 X |

FOREIGN PATENT DOCUMENTS

| | | | |
|---|---|---|---|
| 2658933 | 2/1978 | Fed. Rep. of Germany | 174/138 D |
| 2718562 | 11/1978 | Fed. Rep. of Germany | 411/2 |
| 1044233 | 6/1953 | France | 411/427 |
| 929807 | 6/1963 | United Kingdom | 411/427 |
| 1321103 | 6/1973 | United Kingdom | 411/427 |

*Primary Examiner*—Lloyd A. Gall
*Assistant Examiner*—Curtis B. Brueske
*Attorney, Agent, or Firm*—J. P. O'Brien; T. W. Buckman

[57] ABSTRACT

An anchor for secure reception of a fastener such as a screw shank can be frictionally welded, by high-speed rotation of the anchor, to the structure upon which the fastener is mounted. The anchor is molded from frictionally meltable material, for example a typical engineering thermoplastic such as ABS resin. The anchor has a generally cylindrical body with an end face at one end defining a surface for frictional welding to the compatible structure. The end face has an aperture which receives the screw shank or the like. The cylindrical body has a cup-like configuration having a cavity formed therein extending from the end face to an open end at the opposite end of the cylindrical body. A cylindrical boss is formed within the cavity and extends from the aperture at an entrance end for receiving the fastener. The boss has a frangible cap covering the end of its bore opposite the entrance end. The anchor includes a coupling structure for engagement by a drive tool which rotates the anchor and generates sufficient frictional heating to weld the anchor to the structure on which the fastener is subsequently mounted and anchored. The coupling structure includes radially extending flanges on the anchor body which supports drive tabs and provides movement arms for transmitting the torque applied by the drive tool.

18 Claims, 2 Drawing Sheets

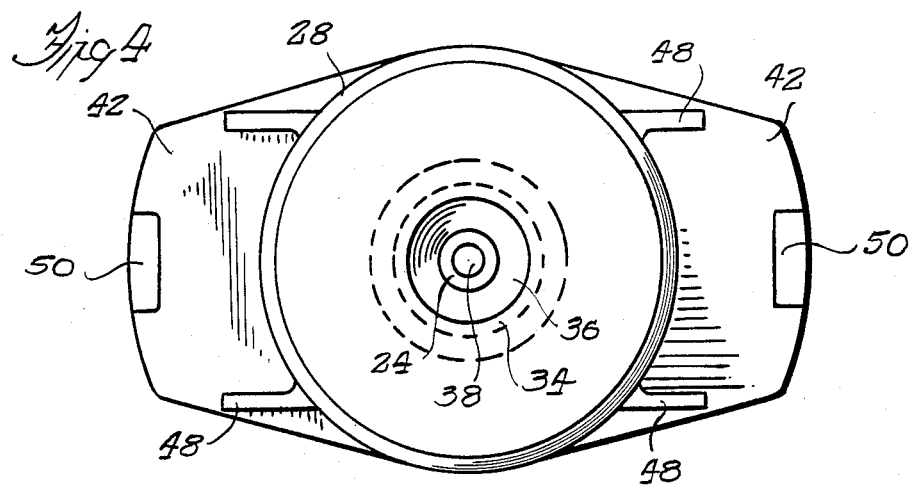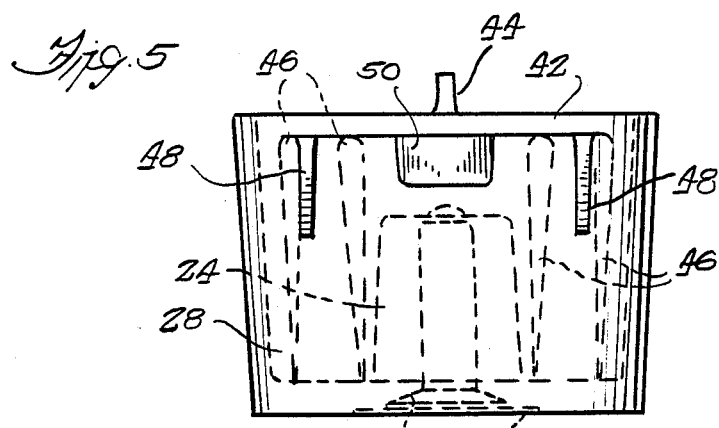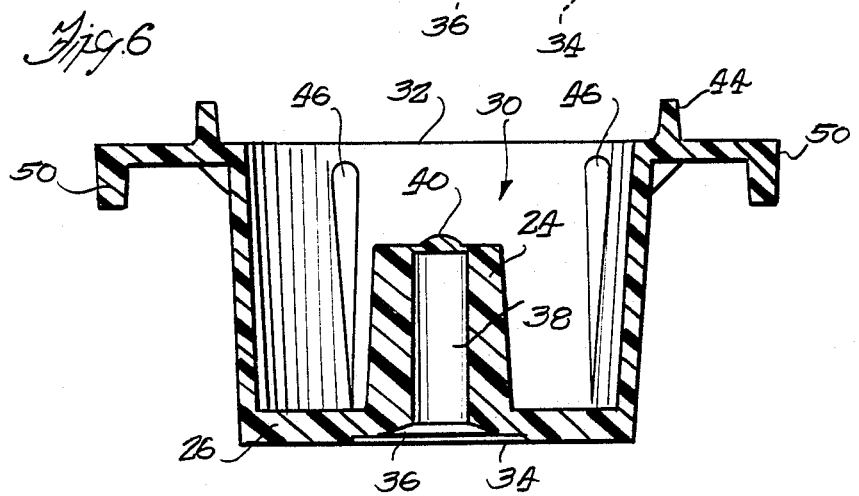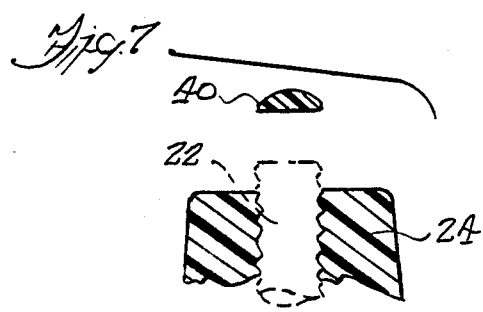

FRICTIONALLY WELDED FASTENING ANCHOR

BACKGROUND OF THE INVENTION

This invention relates to anchoring devices for screw fasteners and particularly relates to plastic anchors which can be frictionally welded to the structure upon which the screw is mounted.

In the asembly or erection of structures in which fastening screws are mounted in a relatively thin sheet or panel of structural material, the screw shank is generally driven into an anchoring device which secures the shank and tightly engages the surface of the sheet or panel in order to prevent the screw from stripping out of the material during the screw installation or ripping out of the material when an applied load is imposed on the screw. Numerous types of discrete anchoring devices have been developed for applications in which the thin sheet material is not employed with a supporting material capable of securing the screw shank. However, the discrete anchoring devices have generally required manual alignment or attachment to the thin sheet material. For example, in fabricating the shell of a conventional home refrigerator, metal devices have typically been attached with adhesive to the plastic inner liner of the refrigerator shell in order to secure screws driven into the liner to support a shelf bracket within the refrigerator. The adhesive attachment of such anchoring devices has prevented entirely automatic fabrication of the refrigerator shell.

SUMMARY OF THE INVENTION

In accordance with this invention an anchor for secure reception of a fastener such as a screw shank can be frictionally welded, by high-speed rotation of the anchor, to the structure upon which the fastener is mounted. The anchor is molded from frictionally meltable material, for example a typical engineering thermoplastic such as ABS resin.

The anchor has a generally cylindrical body and an end face defining a surface for frictional welding to the compatible structure. The end face has an aperture which receives the screw shank or the like. The anchor includes a coupling structure for engagement by a drive tool which rotates the anchor and generates sufficient frictional heating to weld the anchor to the structure on which the fastener is subsequently mounted and anchored.

In a preferred embodiment the coupling structure includes radially extending flanges on the anchor body which support drive tabs and provide moment arms for efficiently transmitting the torque applied by the drive tool. The anchor body can have a cup-like configuration providing an open cavity into which the drive tool can project to improve the rotational stability of the anchor during the welding operation. A central boss extending into the cavity from the welding face of the anchor provides a bore for receiving and anchoring the fastener shank.

BRIEF DESCRIPTION OF THE DRAWINGS

FIG. 4 is a bottom plan view of the anchoring device in FIGS. 1-3;

FIG. 5 is an end elevation view of the anchoring device in FIG. 4;

FIG. 6 is a sectional view taken along the line 6—6 in FIG. 2, and particularly illustrating a cup-like body and screw-receiving boss inwardly projecting into the open cavity of the body from the bottom wall of the anchoring device; and FIG. 7 is a sectional view of the screw boss shown in FIG. 6 illustrating detachment of a frangible cap from the end of the central bore in the screw boss by a screw shank driven through the bore and anchored in the boss.

DETAILED DESCRIPTION OF THE ILLUSTRATED EMBODIMENT

Figure 1:
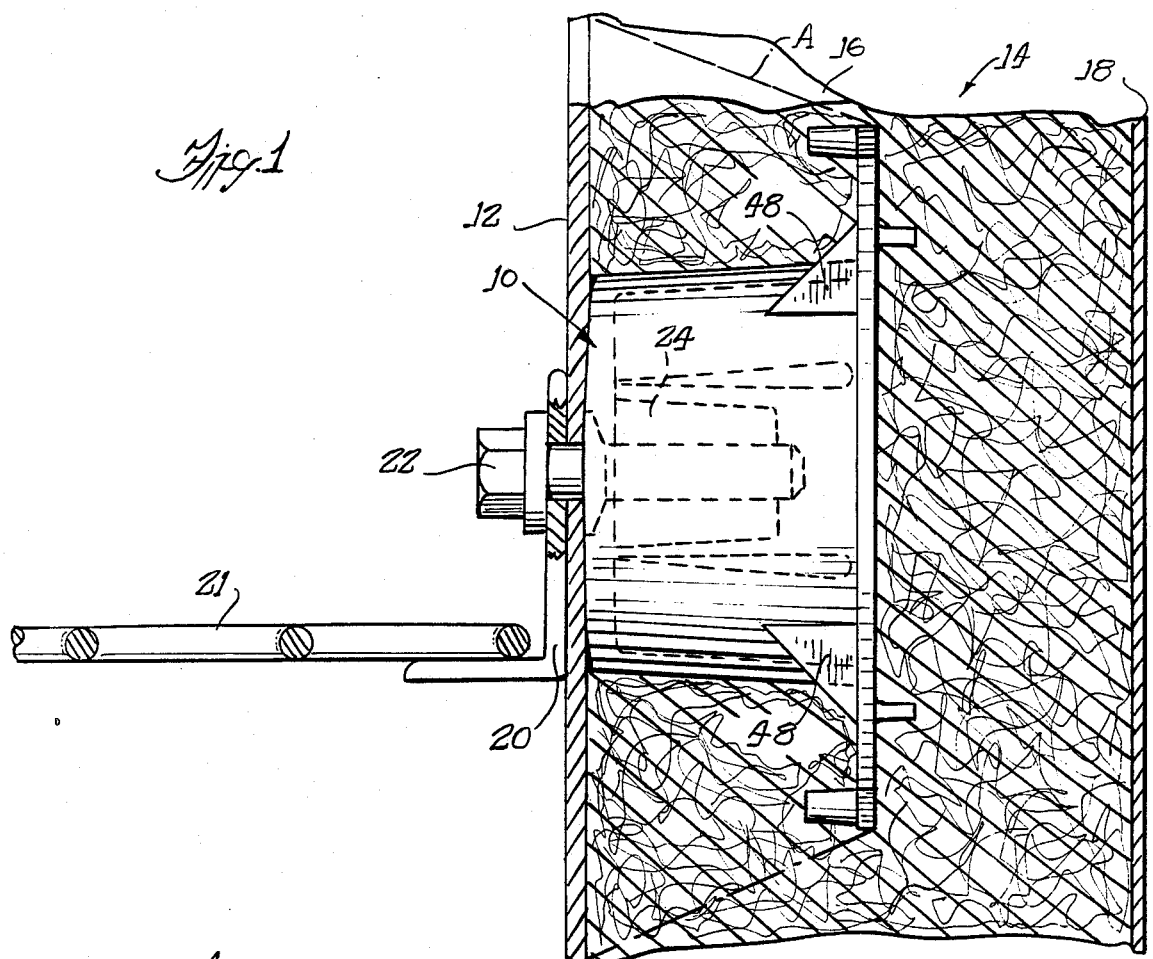
FIG. 1 is a side elevation, partially in section, illustrating an embodiment of the anchoring device of the invention frictionally welded to the plastic inner liner of a refrigerator shell through which a typical fastening screw projects into the securing anchor.

Referring to FIG. 1, an embodiment of the fastener anchor generally designated by reference character 10 is frictionally welded to the unexposed surface of a plastic inner liner 12 which is the inner wall of a refrigerator shell generally designated by reference character 14. In the particular installation illustrated in FIG. 1, the anchor 10 is molded from a thermoplastic, for example, an ABS resin such as Lustran ® (grade I-648) manufactured by Monsanto Chemical Co., so that the anchor 10 can be frictionally or "spin" welded to a typical ABS or similar plastic liner 12 by rotating the anchor 10 against the liner 12 at sufficiently high speed to melt and weld the two compatible plastics. After spin welding multiple anchors 10 to the liner wall 12, the anchors can be immersed in foam insulation 16 which is injected between the liner 12 and the typical metal, outer wall 18 during fabrication of the refrigerator shell.

After assembling the shell 14, a typical shelf-support bracket 20 (supporting grate 21) can be mounted on the exposed surface of the liner 12 by driving a conventional self-tapping screw 22 through pre-fabricated holes in the bracket 20 and the liner 12; the screw 22 is anchored by self-tapping through the centrally bored, cylindrical boss 24 of the anchor 10 which is aligned with the pre-fabricated hole in the liner 12 when the anchor is welded.

Figure 2:
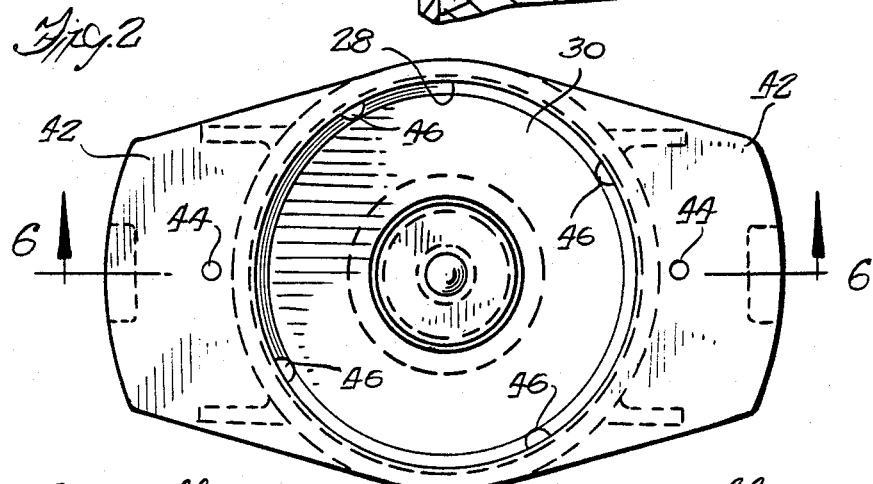
FIG. 2 is a top plan view of the anchoring device in FIG. 1.
Figure 3:
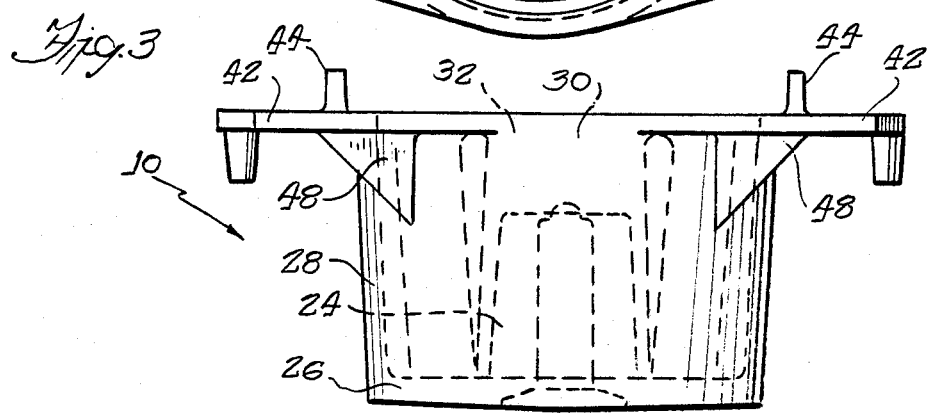
FIG. 3 is a side elevation view of the anchoring device in FIGS. 1 and 2.

Referring to FIGS. 2, 3 and 6, the boss 24 extends inwardly from the coaxially aligned, annular end face 26 which forms both the bottom wall and the welded surface of the cylindrical, cup-like main body 28 of the anchor 10 The cavity 30 formed within the cup-like body 28 has an opening mouth 32 at the end opposite the end face 26 as best shown in FIG. 6. A shallow recess 34 and counterbore 36 define an entrance aperture through the end face 26 to form one end of a central bore 38 through the boss 24. The recess 34 and counterbore 36 prevent melted plastic from obstructing the entrance to the bore 38 during the welding operation, and also promote guidance of the screw when the bore 38 is slightly misaligned in relation to the prefabricated hole in the liner 12. A mold core pin can be inserted to form the bore 38, recess 34 and counterbore 36 during molding of the anchor 10. The opposite, blind end of the bore 38 has a frangible cap 40 which prevents the foamed insulation from escaping through the bore 38 when the foam is injected during the fabrication of the shell 14; however, the cap 40 can be ruptured by the screw shank 22, as illustrated in FIG. 7, so that the screw shank can project from the boss 24 when the screw is driven through the bore 38 to mount the bracket 20 as illustrated in FIG. 1.

Referring to FIGS. 2–5, the upper end of the body 28, adjacent the mouth 32, has a pair of lateral, outwardly projecting flanges which are aligned in wing-like, coplanar opposition in the illustrated embodiment. The lateral extension of the flanges 42 promotes multiple functions. The extension of the flanges 42 promotes anchoring of the anchor 10 itself over a large conical volume A within the insulation 16 to improve reinforcement of the welded interface against the torque applied by the loaded shelf bracket 20 The flanges 42 also provide an extended platform which increases the moment arm of the torque applied by the drive tool (not shown) on the anchor 10 about its central axis through the drive tabs 44 which project perpendicularly and are supported by the respective flanges 42. In order to prevent the anchor 10 from burning through the liner 12 during the frictional welding operation, the drive tabs 44 can be dimensioned to allow fracture and detachment from the respective flange 42 when an upper limit of resistance, for example in the range 3.7–7 in-lb., to the applied welding torque rotating the anchor 10 is exceeded.

As particularly shown in FIGS. 2 and 5, a plurality of structural ribs 46 project from the interior surface of the body 28 into the cavity 30; the ribs 46 can engage surfaces of a stabilizer portion of the driving tool which can be inserted longitudinally into the cavity 30 in order to improve the radial and longitudinal stability of the anchor 10 during the high-speed rotation by the driving tool. In the illustrated embodiment, the four axially parallel ribs 46 are equally spaced around the inner circumference of the body 28, and each rib 46 has a generally semi-circular cross-sectional profile. The ribs 46 can be axially tapered inversely in relation to axial taper of the cup-like body 28 so that the inwardly projecting ribs 46 cooperate to provide piloting guidance and engage a straight wall surface on the stabilizing portion of the driving tool inserted into the body cavity 30.

Referring particularly to FIGS. 2–4, a plurality of struts 48 project downwardly from the lower surface of a respective flange 42 and are integrally attached to the exterior surface of the body 28; as shown in FIG. 1, the struts 48 are immersed in the insulation 16 and improve the resistance of the anchor 10 to the driving torque applied to install the screws 22.

The radially outer periphery of each of the flanges 42 has a perpendicular and downwardly projecting conveying tab 50; the tabs 50 are oriented parallel to one another and provide guidance for the anchor 10 through automatic feeding equipment (not shown) in order to increase the speed of the shell fabricating operation.

While a preferred embodiment of the anchor is illustrated and described, it is envisoned that those skilled in the art may devise various modifications derived from this description, and the specific embodiment described does not indicate limitation of the scope of the appended claims.

The invention is claimed as follows:

1. An anchor for secured reception of a fastener and for frictionally welded attachment to a structure upon which the fastener is mounted, comprising: a body having a generally cylindrical wall, an axially exposed face at one end of said wall defining a surface for frictionally welding to said structure, and an open end adjacent said cylindrical wall at the other end of said wall, said face including an aperture for receiving said fastener, and coupling means for engagement by a drive tool in order to propel said anchor into sufficient motion to generate said frictional welding.

2. The anchor according to claim 1 wherein said body includes a generally cylindrical boss extending from said face inwardly within said body wall, said boss having an internal bore extending from said aperture at an entrance end for receiving the fastener.

3. The anchor according to claim 2 wherein said boss has a frangible cap covering an end of said bore opposite said entrance end, said cap being frangible for detachment from the boss upon impact by the fastener driven through said bore.

4. The anchor according to claim 3 wherein said bore extends entirely through said boss.

5. The anchor according to claim 1 wherein said body has a cup-like configuration having a cavity formed therein extending from said axial face to said open end of said body wall.

6. The anchor according to claim 4 wherein the length of said boss is less than the length of said cavity.

7. The anchor according to to claim 5 further including a plurality of ribs radially projecting inwardly from the interior surface of said body wall into said cavity.

8. The anchor according to claim 1 wherein said aperture includes a recess formed in said face in order to prevent obstruction of said aperture during said welding.

9. The anchor according to claim 1 wherein said anchor is molded from thermoplastic resin.

10. An anchor for secured reception of a fastener and for frictionally welded attachment to a structure upon which the fastener is mounted, comprising: a body having a generally cylindrical wall, an axially exposed face at one end of said wall defining a surface for frictional welding to said structure, said face including an aperture for receiving said fastener, a pair of flanges aligned in wing-like opposition radially extending from the opposite end of said wall from said face and an open end of said cylindrical wall adjacent said flanges, and coupling means for engagement by a drive tool in order to propel said anchor into sufficient motion to generate said frictional welding.

11. The anchor according to claim 10 wherein said body includes a generally cylindrical boss extending from said axial face inwardly within said body wall, said boss having an internal bore extending from said aperture at an entrance end for receiving the fastener.

12. The anchor according to claim 11 wherein said boss has a frangible cap covering an end of said bore opposite said entrance end, said cap being frangible for detachment from the boss upon impact by the fastener driven through said bore.

13. The anchor according to claim 12 wherein said bore extends entirely through said boss.

14. The anchor according to claim 10 wherein said body has a cup-like configuration having a cavity formed therein extending from said axial face to said open end of said body wall.

15. The anchor according to claim 13 wherein the length of said boss is less than the length of said cavity.

16. The anchor according to claim 14 further including a plurality of ribs radially projecting inwardly from the interior surface of said body wall into said cavity.

17. The anchor according to claim 16 wherein said aperture includes a recess formed in said face in order to prevent obstruction of said aperture during said welding.

18. The anchor according to claim 16 wherein said anchor is molded from thermoplastic resin.

* * * * *